Patented Nov. 30, 1948

2,455,260

UNITED STATES PATENT OFFICE 2,455,260

REGENERATION OF ACTIVATED CARBON BY INORGANIC LIQUID TREATMENT

Gerhard Jan Meerdink, Arnhem, Netherlands, assignor to American Enka Corporation, Enka, N. C., a corporation of Delaware No Drawing. Application January 27, 1947, Serial No. 724,713. In Germany February 16, 1944

Section 1, Public Law 690, August 8, 1946
Patent expires February 16, 1964

2 Claims. (Cl. 252—412)

The present invention relates to the regeneration of activated carbon and more particularly relates to a process for removing impurities from activated carbon with which it has become contaminated incident to the manufacture of viscose rayon.

During the production of viscose rayon, large quantities of waste gases are generated. These gases must be removed from the manufacturing plant because they are dangerous and hazardous to the health of the workers. As these gases contain valuable chemicals, particularly carbon disulphide which can be re-employed in the process, it is undesirable to allow them to escape into the atmosphere, and accordingly, it is highly economical to confine the same and recover them through known processes.

In one of the practical processes for recovering these gases, activated carbon is employed. It is used in adsorption towers through which the waste gases are conducted after the latter have been freed from hydrogen sulphide by well-known methods. The carbon disulphide which is present in high concentrations in the waste gases is passed through the towers and adsorbed on the carbon. However, the activated carbon retains its effect for only a limited time because it becomes contaminated or polluted with sulphuric acid and sulphur. It is known that activated carbon which has been contaminated in this manner, can be regenerated and thereby restored to its effective state. This has been effected by first washing the carbon with a bicarbonate solution and then subjecting it to a so-called thermic or heat treatment. However, in order to subject the carbon to a heat treatment, it must first be removed from the adsorption apparatus and upon regeneration, returned to the same. This known process therefore requires a large amount of work and considerable loss of time. Moreover, it usually results in the loss of about 25% of the valuable chemicals, because it is impossible to prevent an active development of coal dust.

The industry in general has done considerable research in attempting to develop a more efficient, less expensive and more hygienic process. It has now been determined that the problem can be solved in a very simple manner. Activated carbon which, in the course of manufacturing viscose rayon, has become contaminated or polluted with sulphuric acid and sulphur as a result of passing waste gases therethrough, can be regenerated in the following manner. The carbon is washed with a warm bicarbonate solution which removes the sulphuric acid. The carbon is next washed with a sodium sulphite solution maintained at about 80° C. This solution transforms the sulphur into sodium thiosulphate. The carbon is finally washed alternately with hot and cold water, steamed, dried and cooled. By experiments it has been shown that the above treatment with a sodium sulphite solution at an elevated temperature facilitates a quick transformation of the sulphur, providing the sulphuric acid has been removed previously by means of a bicarbonate solution.

Activated carbon which has been treated in the foregoing simplified manner, was determined to be substantially free from sulphuric acid and sulphur and its effectiveness re-established so that it could be used again provided it is briefly steamed, well dried and cooled; and the disadvantages arising out of removing the carbon from the apparatus are eliminated. The following example serves to illustrate one exact method in which the present invention can be utilized.

Example

Activated carbon in an adsorption tower which has been contaminated with sulphuric acid and sulphur as a result of passing waste gases therethrough incident to the manufacture of viscose rayon, normally weighs about 1500 kg. In order to remove the sulphuric acid a 6% bicarbonate solution heated to 60° C. is introduced into the apparatus and permitted to circulate therethrough for approximately three hours. After draining the bicarbonate solution, steam is blown through the apparatus for a short time, whereafter an 8% sodium sulphite solution at about 80° C. is pumped into the apparatus for about four hours. After removing that solution, the adsorption tower is filled with a fresh 8% sodium sulphite solution at 80° C. and is circulated for about three hours and drained off. Thereupon water at 80° C. is pumped through the tower for several hours, preferably about eight hours. Finally, the activated carbon is thoroughly washed with cold water, steamed briefly, and again washed with water at 80° C. for several hours. The resulting activated carbon is substantially regenerated and has recovered its effectiveness. It can be used again after steaming briefly, completely drying and cooling.

In order to illustrate the efficiency of the above process, the following results show an average test taken from several experiments: Contaminated carbon in an adsorption tower showed in the lowest layer a sulphur content of 13.5%, in the middle layer 7%, and in the upper layer 1.7%;

that is an average of about 8%. In order to transform this quantity, namely, 120 kg. of sulphur as against 1500 kg. of carbon, a total of 480 kg. of sodium sulphite would have been required, theoretically. However, a surplus of 50%, that is a total of 720 kg., were used in an 8% solution. After the process described above was completed, it was determined that the carbon was free of sulphuric acid and that it contained in the lower portion of the vessel 2.5% sulphur, in the middle portion 1.5% sulphur, and in the upper portion 0.5% sulphur. These were about the same average quantities as those determined after thermic or heat regeneration.

What is claimed is:

1. A process for the regeneration of activated carbon which has been contaminated with sulphur and sulphuric acid resulting from gaseous by-products incident to the manufacture of viscose rayon which consists essentially of washing the carbon with a warm aqueous bicarbonate solution to remove the sulphuric acid, rinsing the carbon at least twice in an aqueous sodium sulphite solution maintained at a temperature of about 80° C. in order to transform the sulphur into sodium thiosulphate, washing the carbon alternately with hot and cold water, and steaming, drying and cooling whereby the regeneration of the carbon is completed.

2. A process for the regeneration of activated carbon which has been contaminated with sulphur and sulphuric acid resulting from gaseous by-products incident to the manufacture of viscose rayon which consists essentially of washing the carbon in a 6% aqueous bicarbonate solution at 60° C. to remove the sulphuric acid, injecting steam into the system, rinsing the carbon twice with an 8% aqueous sodium sulphite solution at 80° C. to transform the sulphur into sodium thiosulphate, washing the carbon with water at a temperature of 80° C. then with cold water, steaming and washing with hot water and then drying and cooling whereby the regeneration of the carbon is completed.

GERHARD JAN MEERDINK.

REFERENCES CITED

The following references are of record in the file of this patent:

UNITED STATES PATENTS

| Number | Name | Date |
| --- | --- | --- |
| 1,892,999 | Ralston et al | Jan. 3, 1933 |

OTHER REFERENCES

Mellor, "Treatise on Inorganic and Theoretical Chemistry," vol. 10, (1930), page 516.